May 26, 1931. K. E. BEMIS 1,807,189
FOOD PRODUCT AND PROCESS OF MAKING THE SAME
Filed March 16, 1927
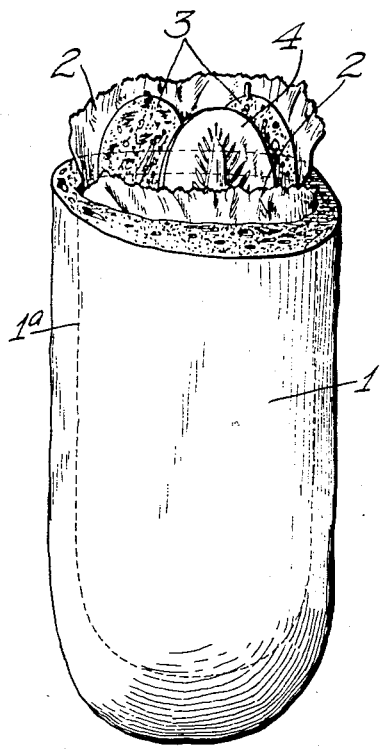
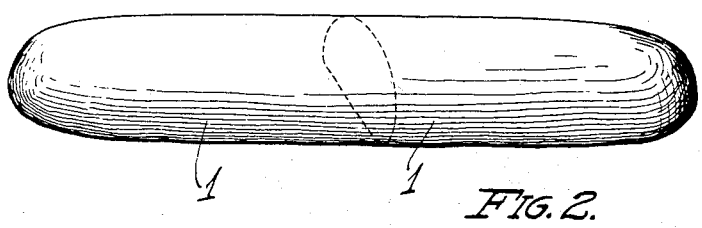
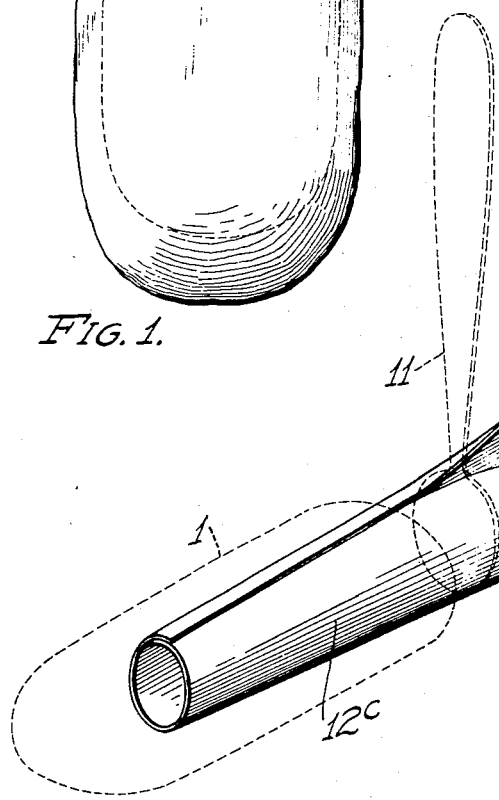
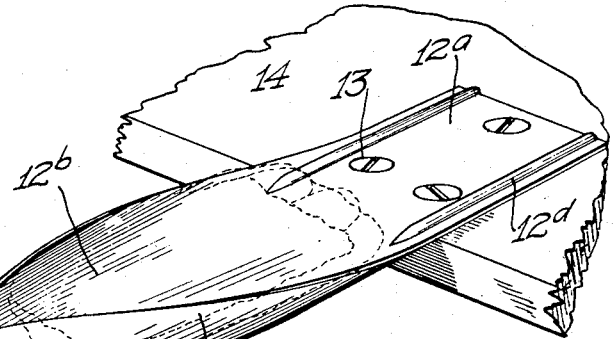
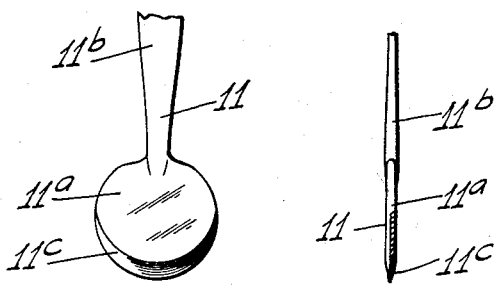
INVENTOR.
KEN E. BEMIS.
BY A. B. Bowman
ATTORNEY Patented May 26, 1931

1,807,189

UNITED STATES PATENT OFFICE

KEN E. BEMIS, OF LOS ANGELES, CALIFORNIA, ASSIGNOR, BY DIRECT AND MESNE ASSIGNMENTS, TO FOUNTAIN PRODUCTS CORPORATION, A CORPORATION OF ILLINOIS

FOOD PRODUCT AND PROCESS OF MAKING THE SAME

Application filed March 16, 1927. Serial No. 175,718.

My invention relates to a food product and to a process of making the same, and more particularly to a food product such as sandwiches made from buns, or the like.

Sandwiches have been heretofore and are now made from two or more slices of bread, or from buns, or biscuits, cut open the greater portion of the distance from the edge at one side. Between the two or more slices of bread, or the two loosely connected parts of the bun, or biscuit, is placed a filler of various kinds, types, tastes, and descriptions. These fillers often consist of a meat product, such as hamburger or "hot-dogs", or other equivalent product, slices of pickles, slices of tomatoes, slices of onions, a garnish, such as lettuce, and a dressing or spice, such as mustard. Such fillers are usually of considerable thickness and difficult to keep in place between the slices of bread, or the parts of the bun or biscuit. When taking a bite from one side of a sandwich with such a filler, a part of the filler often slips out at the other side; or if a part of the filler does not slip out, grease from the hamburger or "hot-dog", or the juices from the tomatoes or pickles, or the dressing runs out of the sandwich over the hands and clothes, and in general causes considerable inconvenience. Of course, the sides may be pinched together to retain the parts of the filler and the juices, resulting, if the bread or buns are fresh, in a doughy sandwich. Although the difficulty and inconvenience is often in part obviated by wrapping a paper napkin around the sandwich, the trouble, difficulty, and inconvenience is not wholly done away with.

The objects of my invention are: first, to provide a sandwich, or similar food product, which will reduce to a minimum the troubles, difficulties and inconveniences often and usually resulting from eating a sandwich, or other food product, of the class mentioned, and one which will retain the filler as well as the juices, and one which can be conveniently handled and eaten; second, to provide a food product of this class which is particularly attractive and appetizing in appearance; third, to provide a food product of this class comprising an edible casing having a pocket therein open at one side or end into which is placed the filler of the food product; fourth, to provide a food product of this class having a baked edible casing provided with a pocket open at one side or end into which is placed the filler; fifth, to provide a food product of this class having a casing provided with a pocket open at one side or end into which may be readily placed various edible solids comprising the filler; sixth, to provide, as a whole, a novelty arranged, made, and combined food product and one which may be easily and economically made; and, seventh, to provide a novel process of combining foods and a novel process of making my food product.

With these and other objects in view, as will appear hereinafter, my invention consists of certain novel features of combination and arrangement of parts and food elements, as will be hereinafter described in detail, and particularly set forth in the appended claims, reference being had to the accompanying drawings and to the characters of reference thereon, which form a part of this application, in which:

Figure 1 is a side perspective view of a sandwich in one form, incorporating my invention; Fig. 2 a perspective view of a long bun, showing by dotted lines, the dividing line for making two buns as shown in Fig. 1; Fig. 3 is a perspective view on a reduced scale of the device or apparatus in one form of construction for making the sandwich shown in Fig. 1, the bun of which the sandwich is made being shown by dotted lines positioned over the one end of the device or apparatus through which the filler is discharged, and the means for discharging the filler from the device or apparatus being also shown by dotted lines in operative position prior to discharging the filler from the device or apparatus; Fig. 4 is a fragmentary side view of one end of the means for discharging the filler from the device or apparatus, shown in Fig. 3; and, Fig. 5 is an edge view of the means shown in Fig. 4.

Like characters of reference refer to similar parts and portions throughout the several views of the drawings.

My food product, as shown in Fig. 1 of the drawings, is a sandwich, and consists of a bun 1, a garnish 2, in the form of lettuce, a meat filler 3 in the form of a split "hot-dog", and a further garnish or appetizer 4 in the form of a slice of a pickle. Other meat products, such as hamburger, and the like, may be also used, and further garnishes, or appetizers, or relishes, such as sliced tomatoes, sliced onions, pimento, or the like, may be also used. The bun 1, shown in Fig. 1, is preferably made from a long bun, shown in Fig. 2, by cutting the same intermediate its ends to form buns, or the casings, for two sandwiches. The bun 1 is slit longitudinally and flatwise from its cut end to near its opposite end, forming a pocket therein, as shown by dotted lines and designated 1a. In this pocket is placed the filler which is assembled within the lettuce or other garnish before placing the filler within the pocket of the bun. When the sandwich is completed, the filler is enclosed at all sides except at the one end by the casing, or bun 1, the filler, comprising the solid edibles of lettuce, meat filler, pickle, and the like, extending some distance beyond the open end of the pocket in the bun, presenting an attractive and appetizing appearance of the food product. It will be noted that as the bun is slit longitudinally the sides and normally bottom end remain intact and do not permit the juices or parts of the filler to drip or slip out.

The bun is slit by any suitable instrument, such as the device shown fragmentarily and on a reduced scale in Figs. 4 and 5. This device, designated 11, is provided with a rounded head portion 11a having a handle 11b, of any suitable shape, extending therefrom. The edge of the rounded portion 11a, opposite the handle 11b, is provided with a keen edge 11c whereby the device, when inserted into the end of the bun, will readily cut a slit and form a deep pocket in the bun.

The device or apparatus for assembling the sandwich is shown in one form in Fig. 3, and consists of a sheet metal member 12 of relatively light gauge, which is secured by means, such as screws 13, to a table 14. The device 12 consists essentially of three portions, namely, the securing portion 12a for supporting the device on the table 14, the filler assembling portion 12b, and the bun supporting and filler discharge portion 12c. The latter portion is tubular and slightly tapered, the walls diverging from the outer to the inner end. The tapered tubular portion merges in gradual curves and lines into the laterally dished filler assembling portion 12b. The portion 12b is relatively wide with the side edges thereof curved or extended upwardly to form a dished retaining portion upon which the several parts of the filler may be laid for assembling the same in the desired manner. The portion 12b merges at its inner end gradually into the securing portion 12a. The latter portion may be provided with ribs 12d for forming a substantially rigid structure throughout its length. The slit bun is placed over the tapered tubular portion 12c a portion of its length, the portion 12c providing an effective guide means for discharging the filler, assembled in the portion 12b, into the pocket of the bun. It will be noted that if the bun is previously slit, the edges thereof are slightly compressed so that the same may be easily placed over the portion, or nozzle 12c. In order to facilitate the discharge of the assembled filler from the portion 12b into and through the portion 12c, the device or instrument 11 is placed at the normally outer end of the assembled filler and used to discharge the same through the tubular portion 12c. It will be noted that the upper edges of the portion 12b converge toward each other at the upper side of the tubular portion, the edges of the tubular portion at the outer end thereof being overlapped. As the member 11 is shifted outwardly, the overlapping edges of the tubular portion 12c separate, permitting the member 11 to be drawn outwardly beyond the outer end of the portion 12b, simultaneously enlarging the discharge passage of the portion 12c, discharging the filler therethrough and removing the prepared sandwich from the apparatus, or the bun may be removed by hand, drawing with it the filler which is free to be discharged by reason of the increased passage in the portion 12c.

It will be noted that instead of slitting the bun prior to placing the same on the discharge portion 12c of the apparatus, the same may be slit simultaneously with the placing thereof on the apparatus.

Though I have shown and described a particular combination and arrangement of parts, elements and ingredients of my food product, and a particular method of preparing and combining the same, I do not wish to be limited to the particular combination and arrangement shown and described, nor to the particular process, but desire to include in the scope of my invention the food product and process substantially as set forth in the appended claims.

Having thus described my invention, what I claim as new and desire to secure by Letters Patent is:

1. The herein described process of making a food product of the class described, consisting in slitting a bun at its edge to form a pocket closed at its sides and bottom end, separately assembling a garnished filler of solid edibles, and inserting the filler into said pocket.

2. The herein described process of making a food product of the class described, consisting in slitting a bun at its edge to form a pocket closed at its sides and bottom end, assembling a filler of meat or equivalent product and an appetizer and enclosing the filler in a garnish and then inserting the assembled filler into the pocket of the bun.

3. A sandwich food product, comprising a core of solid edibles enclosed on all sides and edges, except at one edge, by a continuous edible prebaked flexible bun envelope, said core comprising a meat filler and a juicy appetizer and seasoning enclosed in a garnish for total confinement against displacement to enable the sandwich consumption thereof.

In testimony whereof, I have hereunto set my hand at Los Angeles, California, this 4th day of March, 1927.

KEN E. BEMIS.